US006725877B2

(12) United States Patent
Liorati et al.

(10) Patent No.: US 6,725,877 B2
(45) Date of Patent: Apr. 27, 2004

(54) SOLENOID VALVE FOR DELIVERING A FLUID AT A VARIABLE FLOW-RATE

(75) Inventors: Marco Liorati, Legnago (IT); Daniele Zaupa, Cherubine Cerea (IT); Bruno Giordano, Angiari (IT)

(73) Assignee: Brahma S.p.A., Verona (IT)

( * ) Notice: Subject to any disclaimer, the term of this patent is extended or adjusted under 35 U.S.C. 154(b) by 0 days.

(21) Appl. No.: 09/863,770

(22) Filed: May 23, 2001

(65) Prior Publication Data

US 2002/0029804 A1 Mar. 14, 2002

(30) Foreign Application Priority Data

Sep. 8, 2000 (IT) ..................... RM2000A0484

(51) Int. Cl.[7] ........................ G05D 7/06; F16K 31/06; F16K 31/08
(52) U.S. Cl. ............... 137/486; 137/487.5; 137/614.11; 251/129.04; 251/129.08; 251/129.21
(58) Field of Search ............... 137/486, 487.5, 137/614.11; 251/129.02, 129.04, 129.05, 129.08, 129.15, 129.21, 129.06

(56) References Cited

U.S. PATENT DOCUMENTS

| 2,279,243 | A | * | 4/1942 | Parsons | 251/129.21 |
|---|---|---|---|---|---|
| 2,607,368 | A | * | 8/1952 | Mayer | 251/129.21 |
| 3,004,670 | A | * | 10/1961 | Zonker | 251/129.21 |
| 3,125,321 | A | * | 3/1964 | Van Domelen | 251/129.21 |
| 4,240,468 | A | * | 12/1980 | Brand et al. | 251/129.21 |
| 4,575,009 | A | * | 3/1986 | Giraudi | 251/129.21 |
| 4,653,525 | A | * | 3/1987 | Young | 251/129.21 |
| 4,790,351 | A | * | 12/1988 | Kervagoret | 251/129.21 |
| 4,791,958 | A | * | 12/1988 | Brundage | 251/129.08 |
| 4,794,947 | A | * | 1/1989 | Kuramochi | 137/486 |
| 4,813,443 | A | * | 3/1989 | Pounder | 137/487.5 |
| 5,052,174 | A | | 10/1991 | Bak | |
| 5,348,224 | A | * | 9/1994 | Consadori et al. | 251/129.08 |
| 5,597,013 | A | * | 1/1997 | Ushakov | 251/129.21 |
| 5,848,780 | A | * | 12/1998 | Miller et al. | 251/129.01 |
| 5,988,210 | A | * | 11/1999 | Komiya et al. | 137/487.5 |
| 6,000,628 | A | * | 12/1999 | Lorraine | 251/129.21 |
| 6,019,347 | A | * | 2/2000 | Adams et al. | 251/129.05 |
| 6,026,847 | A | * | 2/2000 | Reinicke et al. | 137/487.5 |
| 6,269,838 | B1 | * | 8/2001 | Woodworth et al. | 251/129.04 |
| 6,321,781 | B1 | * | 11/2001 | Kurth | 251/129.15 |
| 6,389,364 | B1 | * | 5/2002 | Vyers | 137/486 |

FOREIGN PATENT DOCUMENTS

EP 0676589 3/1995

* cited by examiner

Primary Examiner—George L. Walton
(74) Attorney, Agent, or Firm—Darby & Darby

(57) ABSTRACT

The solenoid valve comprises a duct having an inlet opening and an outlet opening through which the fluid can pass substantially without changing direction, a valve seat within the duct, a closure member movable between a closure position and a fully-open position, and electromagnetic means for acting on the closure member in order to move it to any position between the closure position and the open position in dependence on an electrical control quantity.

The electromagnet means comprise a core of ferromagnetic material, fixed firmly to the closure member and movable substantially along the same axis as the fluid, and a solenoid for generating a force on the ferromagnetic core along the same axis. A second closure member, movable along the same axis, may be provided in order to provide a solenoid valve with a double seal.

The solenoid valve described is less bulky and expensive than known solenoid valves because it does not require a metal housing body.

14 Claims, 3 Drawing Sheets

SOLENOID VALVE FOR DELIVERING A FLUID AT A VARIABLE FLOW-RATE

FIELD OF THE INVENTION

The present invention relates to solenoid valves and, more particularly, to a solenoid valve for delivering a fluid at a variable flow-rate, of the type.

BACKGROUND OF THE INVENTION

Solenoid valves of this type are used widely in gas-burner supply systems, for regulating the input gas-flow and thus modulating the production of heat by the burner. A typical known solenoid valve comprises a hollow metal body with an inlet connector and an outlet connector with a valve seat, and a closure member movable along an axis perpendicular to the flow of the fluid. The closure member is connected or otherwise mechanically coupled to a ferromagnetic core which forms part of a magnetic circuit activated by a solenoid mounted on the body. The valve seat and the closure member are shaped in a manner as to define between them an aperture the size of which is variable continuously from zero, that is, from a position in which the flow of fluid is blocked, to a maximum value, that is, to a position in which the fluid has the maximum flow-rate, in dependence on an electrical control quantity, usually the current passing through the solenoid. Flow-rate regulating means may also be provided to ensure stable positioning of the closure member at all points of its travel and gradual movement of the closure member, without hysteresis. The hollow body is generally made of a ferrous alloy, by pressing or die-casting, and has structural and dimensional characteristics such as to ensure the necessary torsional and bending strength. It is generally quite heavy and bulky and constitutes a fairly expensive part of the solenoid valve. The adjustment means also constitute a critical part of the solenoid valve since they are often quite complex, requiring particular care and tight manufacturing tolerances, particularly when they comprise hydraulic position-control systems.

SUMMARY OF THE INVENTION

An object of the present invention is to provide a solenoid valve which does not have a conventional body such as that described above and which is therefore less bulky and expensive than known solenoid valves. This object is achieved, according to the invention, by a solenoid valve for delivering a fluid at a variable flow-rate, comprising a duct having an inlet opening and an outlet opening through which the fluid can pass substantially without changing direction, a valve seat within the duct, between the inlet opening and the outlet opening, a closure member movable between a closure position and a fully-open position, electromagnetic means for acting on the closure member in order to move it to any position, in dependence on an electrical control quantity, the electromagnetic means comprising a core of ferromagnetic material, fixed firmly to the closure member and movable substantially along the same axis as the fluid, and a solenoid for generating a force on the ferromagnetic core along the same axis.

BRIEF DESCRIPTION OF THE DRAWINGS

The invention will be understood better from the following detailed description of three non-limiting embodiments thereof, given with reference to the appended drawings, in which.

DETAILED DESCRIPTION OF THE PREFERRED EMBODIMENTS

Figure 1:
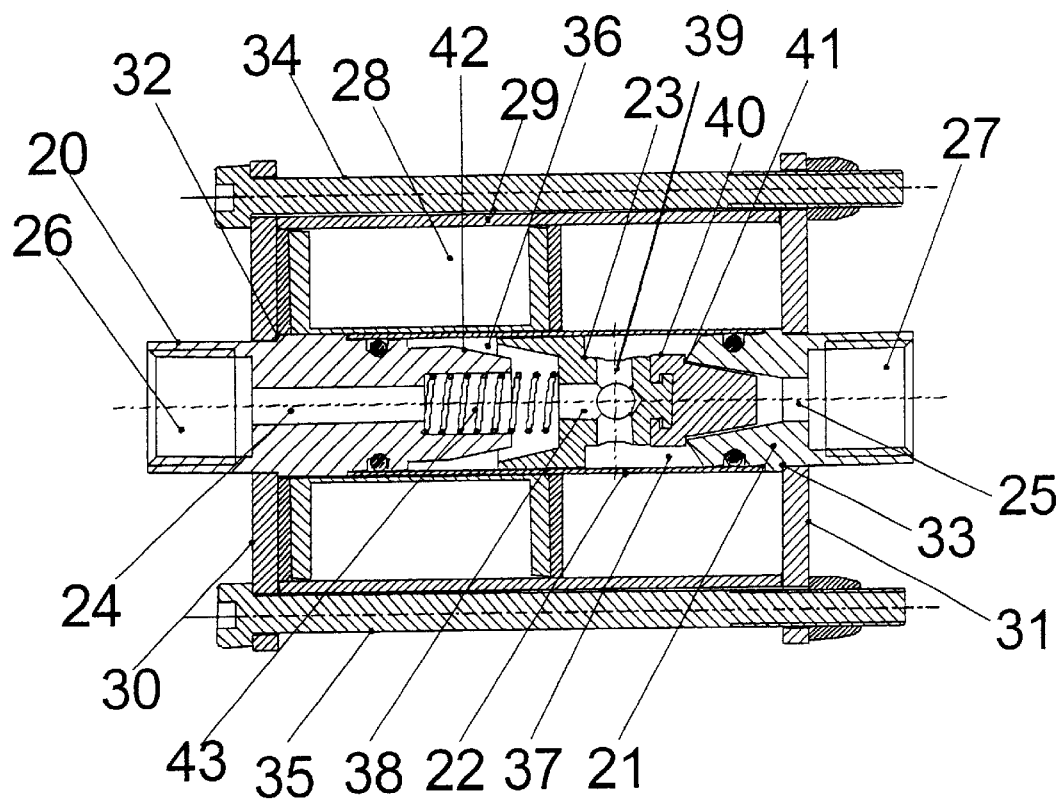
FIG. 1 shows, in axial section, a gas-delivery solenoid valve according to a first embodiment of the invention, more particularly, a normally-closed solenoid valve with a single closure member for modulating the output flow-rate.

As shown in FIG. 1, the valve according to the invention comprises two cylindrical elements 20 and 21, fitted in a leaktight manner in a sheath 22 of non-ferromagnetic material, and a ferromagnetic core 23 slidable in the sheath between the two elements 20 and 21. The elements 20 and 21 have coaxial through-holes 24 and 25 which are enlarged outwardly to form the inlet opening 26 and the outlet opening 27 of the valve, respectively. The element 20 with the inlet opening or, briefly, the inlet element 20, is made of ferromagnetic material and the element 25 with the outlet opening or, briefly, the outlet element 25, may equally well be made of non-ferromagnetic material, for example, brass, or of ferromagnetic material.

A solenoid 28 surrounds the sheath 22 and parts of the elements 20 and 21 and a cylindrical shell 29 surrounds the solenoid 28. The parts of the valve described above are held together by a support structure which, in this embodiment, comprises two discs 30, 31 and two bolts 34, 35. The two discs 30 and 31, which are made of ferromagnetic material and have central holes through which the end portions of the two elements 20 and 21 extend, are in contact with respective annular abutments 32, 33 of the two elements 20 and 21. The two bolts 34 and 35 are inserted in holes provided in opposed radial projections of the discs 30 and 31 and hold the various structural parts of the valve together, ensuring the necessary torsional and bending strength.

The core 23 is formed as a piston which is movable in the cylindrical chamber defined by the sheath 22 and divides this chamber into two compartments 36, and 37. The two compartments 36 and 37 communicate with one another through holes in the core 23, that is, in this embodiment, an axial hole 38 and radial holes 39. A closure member 40 which, in this embodiment, is made of rubber or other elastomeric material, has a frustoconical end and is fixed firmly to the core 23. The axial hole 25 in the element 21 is flared towards the inside of the compartment 37 and forms a valve seat 41 having a conical surface which mates with the conical surface of the closure member 40 when the latter is in the valve-closure position. The portion of the core 23 remote from the closure member 40 has a cavity, also with a frustoconical surface, which mates with a corresponding surface of the inner end 42 of the inlet element 20 when the core 23 is in the position in which the valve is fully open. A spring 43, housed in a cavity in the inner end 42 of the inlet element 20, bears on the facing surface of the core 23 so as to keep the closure member in the closure position, in the absence of other forces.

If a current is passed through the solenoid 28 so as to induce in the core 23 a force in a direction and of an intensity sufficient to overcome the resilient force of the spring 43, the closure member 40 moves away from the valve seat 41. If the inlet element 20 is connected to a gas-supply pipe, the gas can pass through the axial hole 24 of the inlet element 20, the compartment 36, the holes in the core, the compartment 37 and the aperture formed between the closure member 40 and the valve seat 41 by virtue of the displacement of the core 23, to reach the valve-outlet opening 27. The size of the aperture is determined by the current flowing through the solenoid and, more precisely, by the current for which the axial component of the force induced in the core 23 is in equilibrium with the resilient force of the spring 43.

By virtue of the complementary frustoconical surfaces of the core 23 and of the inlet element 20, the axial component of the force induced increases gradually and substantially in proportion to the electrical control quantity.

Figure 2:
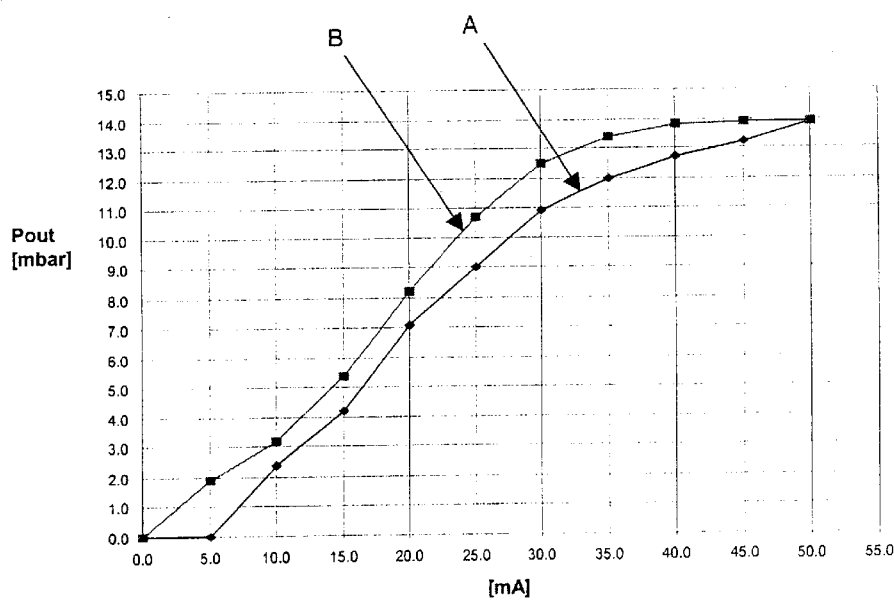
FIG. 2 is a graph showing the output pressure of the solenoid valve of FIG. 1 as a function of the electrical control current.

FIG. 2 is a graph which shows, by way of example, how the pressure Pout, and hence the flow-rate, of the gas output varies as a function of the current I flowing through the solenoid. The curve indicated A relates to an opening operation and the curve indicated B relates to a closure operation.

As can be seen, the configuration of the valve with the closure member movable along the same axis as the flow of fluid (gas in the embodiment described) makes it possible to do without a conventional valve body and thus to save the production costs thereof. The saving is even more appreciable by virtue of the fact that the main parts of the valve can easily be produced by inexpensive turning operations. As already mentioned, the necessary torsional and flexural stiffness are ensured by the support and fixing structure composed of the two opposed discs and of the two bolts.

Figure 3:
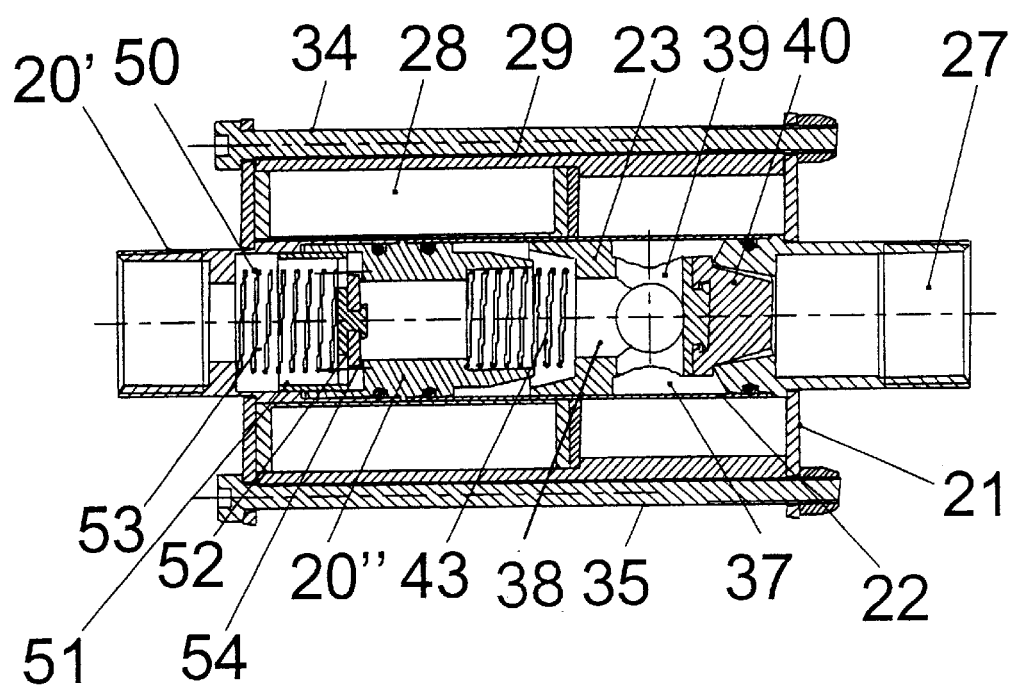
FIG. 3 shows, in axial section, a second embodiment of the solenoid valve according to the invention, more particularly, a normally-closed solenoid valve such as that of FIG. 1, but with an additional closure member.

FIG. 3, in which parts identical or equivalent to those of FIG. 1 are indicated by the same reference numerals, shows a solenoid valve with two closure members which is usable advantageously as a regulation and safety valve for the supply of a gas installation in which a so-called double gas seal is required, for example, a domestic water-heater.

In comparison with the solenoid valve of FIG. 1, the inlet element is divided into two portions: a first portion, which is made of non-ferromagnetic material and indicated 20', and which basically has the function of an inlet connector, and a second portion, which is made of ferromagnetic material and indicated 20" and is separated from the first portion by a cylindrical chamber 50. A second closure member, housed slidably in the chamber 50, is constituted by a sealing member which, in this embodiment, is a rubber disc 52, fixed to one end of a core 51 of ferromagnetic material with radial grooves or axial holes (not visible in the drawing). A spring 53 inside the chamber 50 urges the core 51 towards the portion 20" so that, in the absence of other forces, the rubber disc 52 closes the valve seat 54 defined by the end of the axial hole in the portion 20" of the inlet element. When the solenoid 28 is energized, the core 51 moves, overcoming the resilient force of the spring 53 and opening the passageway for the gas towards the axial hole in the portion 20". The spring 53 selected is such that the core 51 moves to the open position, that is, to the position in which the disc 52 is removed from the valve seat 54, at the latest, at the moment at which the regulation valve with the movable core 23 starts to open. The second seal ensured by the second closure member 52 constitutes a safety measure, should the closure member 40 stick in the open position for any reason.

Figure 4:
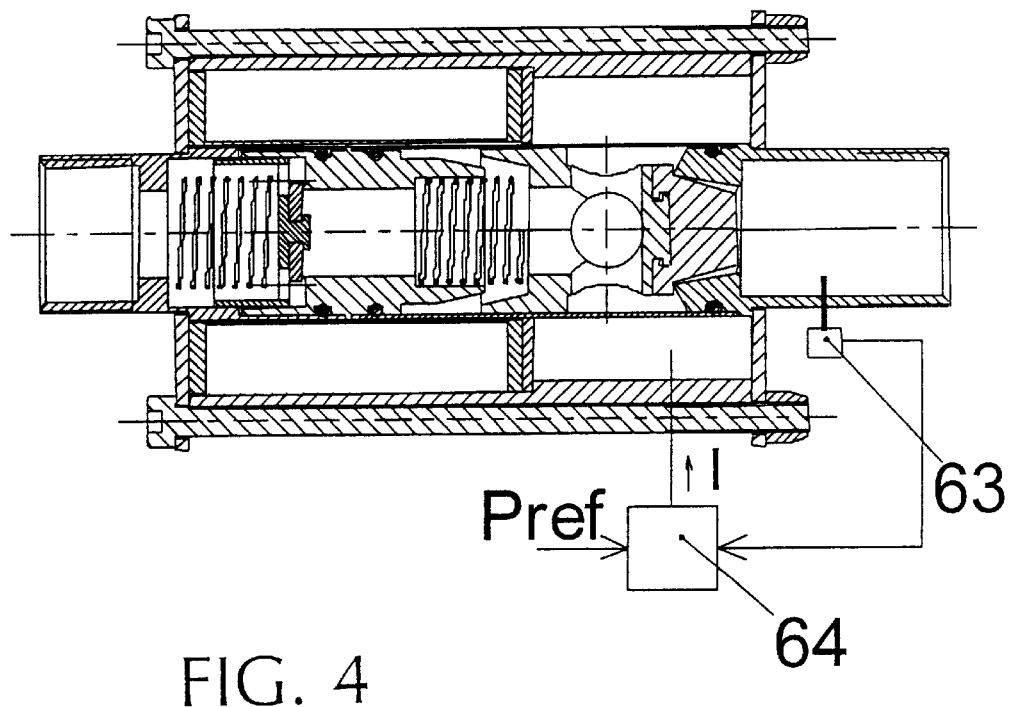
FIG. 4 shows a valve system with a solenoid valve such as that of FIG. 3 with stabilization of the fluid output flow-rate.

If the precision of the regulation of the flow-rate by the solenoid valve of FIG. 1 or of FIG. 3 is not considered sufficient, it is possible to provide, in known manner and as shown schematically in FIG. 4, a pressure sensor 63 downstream of the solenoid valve and an electronic control unit 64 which regulates the current I in the solenoid in dependence on the sensor signal in order to keep the pressure, and hence the flow-rate of fluid output, constant at a predetermined value Pref.

Figure 5:
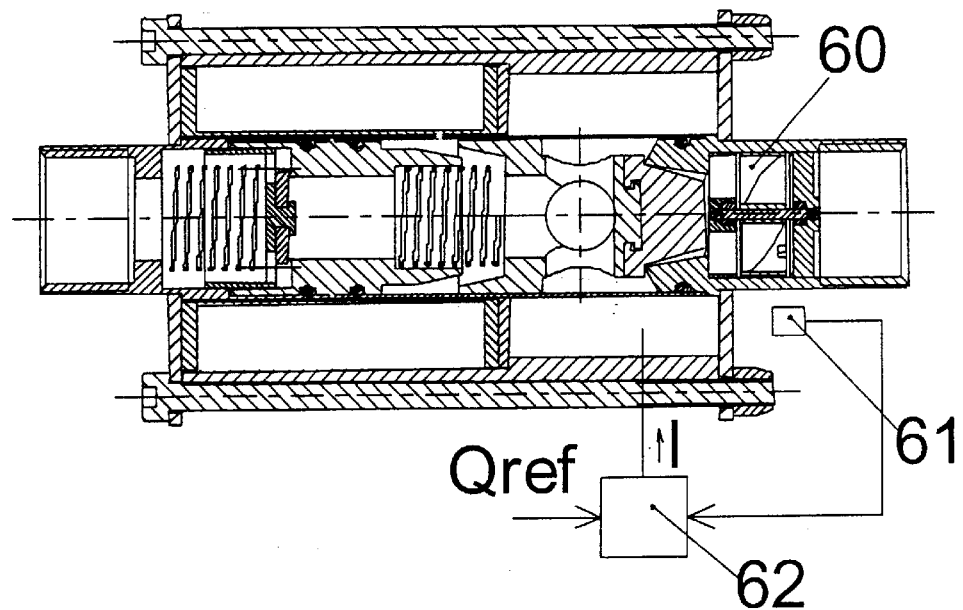
FIG. 5 shows a valve system similar to that of FIG. 4 in which the flow-rate of the fluid is stabilized with the use of a Hall-effect sensor.

A particularly advantageous method of regulating the flow-rate of a solenoid valve according to the invention is shown in FIG. 5. As can be seen, a small turbine 60 is mounted at the output of the solenoid valve and rotates at a speed variable with the output gas flow-rate. At least one magnet is encapsulated in the turbine. A Hall-effect sensor 61 generates an electrical signal proportional to the speed of the turbine. An electronic control unit 62 compares the information coming from the sensor 61 with a reference quantity Qref corresponding to a predetermined flow-rate and causes the supply current I of the solenoid to vary so as to keep the output gas-flow stable at the predetermined flow-rate.

A solenoid valve with flow-rate stabilizer in a single very compact, simple and at the same time, reliable structure, is thus obtained.

Although only three embodiments of the invention have been described and illustrated, clearly many variations and modifications are possible within the scope of the same inventive concept.

We claim:

1. A solenoid valve for delivering a fluid at a variable flow-rate, comprising:

a duct having and inlet opening and an outlet opening through which the fluid can pass substantially without changing direction, a valve seat within the duct, between the inlet opening and the outlet opening, a closure member movable between a closure position and a fully-open position, electromagnetic means for acting on the closure member in order to move it to any position between the closure position and the open position, in dependence on an electrical control quantity, the electromagnetic means comprising a core of ferromagnetic material, fixed firmly to the closure member and movable substantially along the same axis as the fluid, and a solenoid for generating a force on the ferromagnetic core along the same axis, and a further valve seat, a further core of ferromagnetic material, a further closure member fixed firmly to the further core, and further resilient means having dimensions such that, when the solenoid is not energized, the further closure member is urged against the further valve seat in order to block the passageway for the fluid and, when the solenoid is energized, the further closure member is removed from the valve seat to allow the fluid to pass through.

2. A solenoid valve according to claim 1, comprising:

an inlet element which defines a first portion of the duct adjacent the inlet opening and is made at least partially of ferromagnetic material, an outlet element which defines a second portion of the duct adjacent the outlet opening and comprises the valve seat and, a sheath of non-ferromagnetic material which joins the inlet element to the outlet element and defines between these elements a chamber in which the core with the closure member is housed in a slidable manner.

3. A solenoid valve according to claim 2, comprising resilient means for urging the core, with the closure member, to the closure position.

4. A solenoid valve according to claim 2 in which the core divides the chamber defined by the sheath into a first compartment which is in communication with the first portion of the duct, and a second compartment which is in communication with the second portion of the duct when the closure member is not in the closure position, the core comprising ducting means which put the two compartments of the chamber into communication with one another.

5. A solenoid valve according to claim 2, having a support structure comprising two discs of ferromagnetic material with central openings through which the end portions of the inlet element and of the outlet element extend, and fixing means which interconnect the two discs.

6. A solenoid valve according to claim 1 in which the closure member and the valve seat have respective substantially complementary conical surfaces.

7. A solenoid valve according to claim 1 in which the inlet element and the core have respective substantially complementary conical surfaces.

8. A valve system comprising a solenoid valve according to claim 1, means for detecting the flow-rate of the fluid output from the solenoid valve and regulating means for varying the electrical quantity (I) controlling the solenoid in a manner such as to keep the flow-rate of the fluid output at a predetermined value.

9. A valve system according to claim 8 in which the detecting means comprise a turbine disposed in the path of the fluid output, at least one permanent magnet movable with the turbine, and Hall-effect sensor, and in which the regulating means comprise an electronic unit for controlling the electrical control quantity in dependence on the difference between a signal generated by the Hall-effect sensor and a signal corresponding to the predetermined flow-rate value.

10. A valve system according to claim 8 in which the detecting means comprise a pressure sensor disposed in the path of the fluid output, and in which the regulating means comprise an electronic unit for controlling the electrical control quantity in dependence on the difference between a signal generated by the pressure sensor and a predetermined pressure signal corresponding to the predetermined flow-rate value.

11. A solenoid valve for delivering a fluid at a variable flow-rate, comprising:

a duct having an inlet opening and an outlet opening through which fluid can flow without substantially changing direction;

a first valve seat within the duct between the inlet opening and the outlet opening;

a first closure member movable between a closure position and a fully-open position to which is fixed a first core of ferromagnetic material movable substantially along the same axis as the fluid;

a solenoid for generating a force on the first core along the same axis to move the first closure member to any position between the closure position and the open position in dependence on an electrical control quantity, and a second valve seat, a second closure member having a second core of ferromagnetic material fixed thereto, and at least one resilient member adapted to urge the second closure member against the second valve seat when the solenoid is not energized to block fluid flow, and when the solenoid is energized, the second closure member is removed from the valve seat thereby to allow fluid flow.

12. A valve system comprising:

a solenoid valve according to claim 11;

a detector for detecting flow-rate of fluid output from the solenoid valve; and a regulator for varying the electrical control quantity to maintain the flow-rate of fluid output at a predetermined value.

13. The valve system of claim 12, wherein the detector comprises a turbine disposed in the path of the fluid output, at least one permanent magnet movable with the turbine, and a Hall-effect sensor, and the regulator comprises an electronic unit for controlling the electrical control quantity in dependence upon a difference between a signal generated by the Hall-effect sensor and a signal corresponding to the predetermined flow-rate value.

14. The valve system of claim 12, wherein the detector comprises a pressure sensor disposed in the path of the fluid output, and the regulator comprises an electronic unit for controlling the electrical control quantity in dependence on a difference between a signal generated by the pressure sensor and a signal corresponding to the predetermined flow-rate value.

* * * * *